United States Patent
Sultenfuss

(10) Patent No.: US 8,745,423 B2
(45) Date of Patent: *Jun. 3, 2014

(54) SYSTEM FOR COMBINED INPUT OUTPUT MODULE AND ZERO POWER OPTICAL DISK DRIVE WITH ADVANCED INTEGRATION AND POWER

(71) Applicant: Dell Products, LP, Round Rock, TX (US)

(72) Inventor: Andrew T. Sultenfuss, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/015,500

(22) Filed: Aug. 30, 2013

(65) Prior Publication Data

US 2014/0006813 A1  Jan. 2, 2014

Related U.S. Application Data

(63) Continuation of application No. 12/912,194, filed on Oct. 26, 2010, now Pat. No. 8,549,332.

(51) Int. Cl.
*G06F 1/00* (2006.01)
*G06F 3/00* (2006.01)

(52) U.S. Cl.
USPC .............................. 713/300; 713/323; 710/18

(58) Field of Classification Search
USPC ........................................................ 713/300
See application file for complete search history.

(56) References Cited

U.S. PATENT DOCUMENTS

| | | | |
|---|---|---|---|
| 5,278,730 A | 1/1994 | Kikinis | |
| 5,440,693 A | 8/1995 | Arnold et al. | |
| 5,931,958 A * | 8/1999 | Bouvier et al. | 714/48 |
| 6,189,050 B1 | 2/2001 | Sakarda | |
| 6,496,103 B1 | 12/2002 | Weiss et al. | |
| 6,505,258 B1 | 1/2003 | Sakarda et al. | |
| 7,262,961 B2 * | 8/2007 | Motoe et al. | 361/679.41 |
| 7,634,667 B2 | 12/2009 | Weaver et al. | |
| 7,836,319 B2 | 11/2010 | Oh et al. | |
| 8,176,345 B2 | 5/2012 | Kawakami | |
| 2008/0065845 A1 | 3/2008 | Montero et al. | |
| 2009/0063877 A1 | 3/2009 | Lewis et al. | |
| 2009/0273764 A1 | 11/2009 | D'Alessio et al. | |
| 2009/0282235 A1 | 11/2009 | Perng et al. | |
| 2010/0115314 A1 | 5/2010 | Sultenfuss | |
| 2012/0102338 A1 | 4/2012 | Sultenfuss | |

* cited by examiner

*Primary Examiner* — Suresh Suryawanshi
(74) *Attorney, Agent, or Firm* — Larson Newman, LLP

(57) ABSTRACT

An information handling system includes a module bay, a voltage control switch, and a controller. The module bay configured to receive a module, and to connect the module to the information handling system. The voltage control switch is in communication with the module bay, and is configured to provide power to the module bay. The controller is in communication with the module bay and with the voltage control switch. The controller is configured to detect a type of the module connected to the module bay, and to send a power control override signal to the voltage control switch when the type is a specific type, wherein the power control override signal causes the voltage control switch to disregard a power down signal received for the module bay and continue to provide power to the module bay.

19 Claims, 3 Drawing Sheets

SYSTEM FOR COMBINED INPUT OUTPUT MODULE AND ZERO POWER OPTICAL DISK DRIVE WITH ADVANCED INTEGRATION AND POWER

CROSS REFERENCE TO RELATED APPLICATIONS

This application is a continuation of U.S. patent application Ser. No. 12/912,194, entitled "System for Combined Input Output Module and Zero Power Optical Disk Drive with Advanced Integration and Power," filed on Oct. 26, 2010, the disclosure of which is hereby expressly incorporated by reference in its entirety.

FIELD OF THE DISCLOSURE

This disclosure generally relates to information handling systems, and more particularly relates to a system for combined input output module and zero power optical disk drive with advanced integration and power.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system may include multiple input/output modules, such as a peripheral component interface express (PCIe), a serial advanced technology attachment (SATA), and an optical disk drive (ODD). The information handling system also may include a control circuit to provide power/voltage control of the ODD in a module bay of the information handling system. The control circuit can support zero power optical disk drives (ZPODD), such that the control circuit can power down the ODD during periods of inactivity in the ODD. While the ODD is powered down, the control circuit can receive a power on signal from the ODD indicating that a user is requesting power for an operation in the ODD, such as ejecting the optical disk. Thus, the control circuit can power down the ODD disk drive during periods of inactivity and provide power back to the ODD for operations requested while the ODD is powered down.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
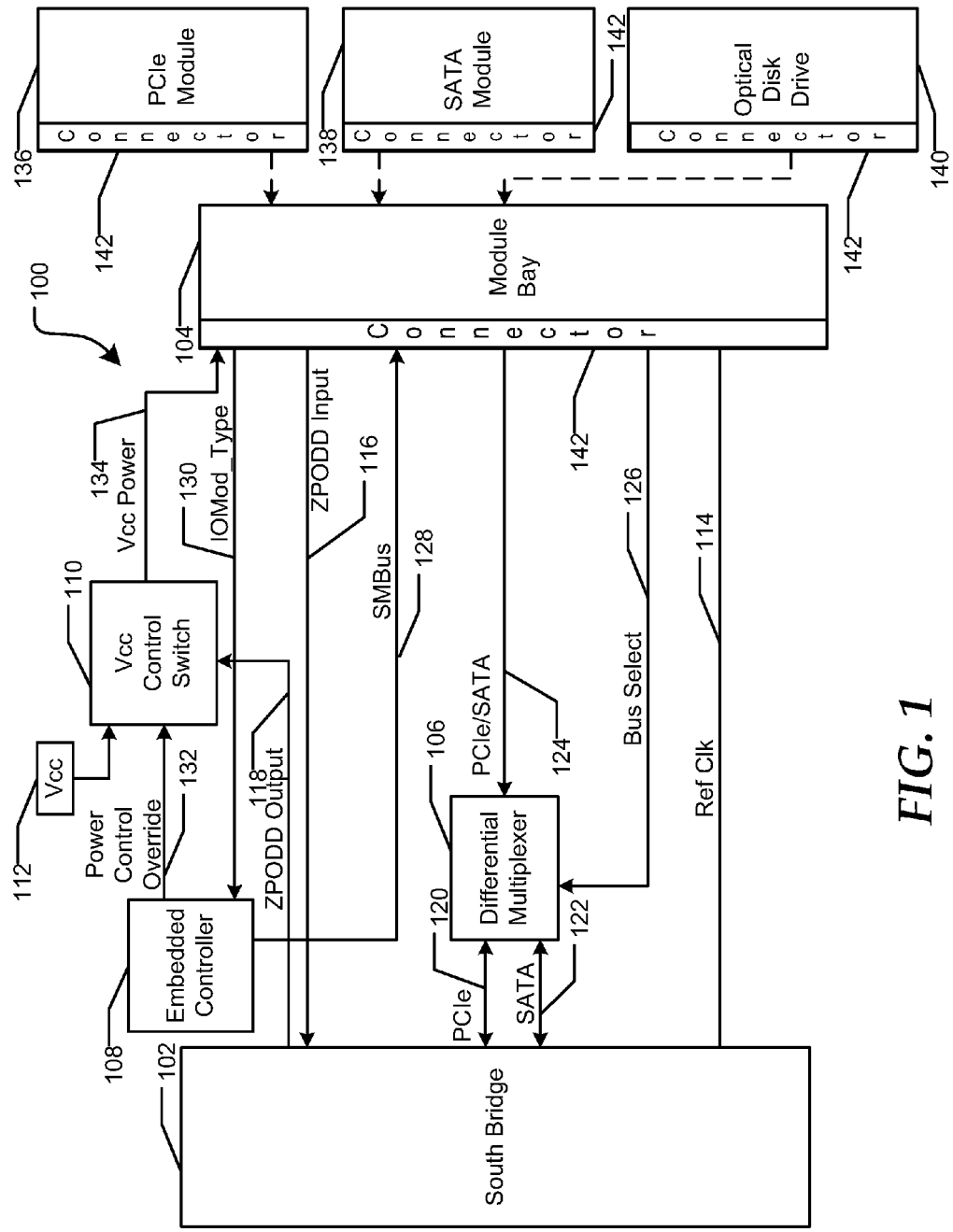
FIG. 1 is a block diagram of a zero power optical disk drive module system of an information handling system.

FIG. 1 shows a control system 100 for a multifunction expansion bay including an optical disk drive (ODD), which can include a zero power optical disk drive (ZPODD) support for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The control system 100 includes a south bridge 102, a module bay 104, a differential multiplexer 106, an embedded controller 108, a voltage control switch 110, and a voltage reference 112. The south bridge 102 is in communication with the module bay 104 via a reference clock 114 and a ZPODD input bus 116. The south bridge 102 is in communication with the control switch 110 via a ZPODD output bus 118. The south bridge 102 can communicate with the differential multiplexer 106 via a peripheral component interface express (PCIe) bus 120 and/or a serial advanced technology attachment (SATA) bus 122. The module bay 104 can communicate with the differential multiplexer 106 via a PCIe/SATA bus 124 and/or a bus select line 126. The module bay 104 is in communication with the embedded controller 108 via a system management bus (SMBus) 128, and an input/output (I/O) module type bus 130. The embedded controller 108 is in communication with the voltage control switch 110 via the input/output module type bus 130, and a power control override bus 132. The module bay 104 can receive power from the voltage control switch 110 via a Vcc power line 134.

The module bay 104 is configured to connect the control system 100 of the information handling system to one of a number of modules, such as a PCIe module 136, a SATA module 138, an optical disk drive (ODD) 140, or the like. The PCIe module 136, the SATA module 138, and the ODD 140 can all utilize the same type of connector to connect to the module bay 104, such as an interface connector 142. The interface connector 142 can be a slimline connector. The PCIe module 136, the SATA module 138, and the ODD 140 can each have substantially the same pin layout, such that the pins on the modules line up with the connections on the module bay 104, such as the interface connector 142. However, even though each of the modules can have substantially the same pin layout, the pins of the modules can have different uses and/or voltage requirements. For example, each of the modules 136, 138, and 140 can use the same pin as the power supply input for the module but the required supply voltage can vary between modules.

In one embodiment, the PCIe module 136 and the SATA module 138 can require a continuous voltage supply, and the ODD 140 can be a ZPODD module such that the OOD can be powered down when the south bridge 102 detects inactivity from the module. Also, the other pins on the module can be utilized to communicate different information to and from the south bridge 102 depending on the module 136, 138, or 140. Thus, if each module 136, 138, or 140 communicated with the south bridge 102 over the same bus when each module was individually connected to the module bay 104, the south bridge may not be able to communicate with each of the modules because the bus may identify the information incorrectly to the south bridge. Therefore, each module 136, 138, and 140 may require a separate bus for communicating with the south bridge 102.

Therefore, each module capable of be connected into the module bay 104 may need a compatible bus for communication with the south bridge 102. Each of the modules can transmit signals to the differential multiplexer 106 over the same communication bus, the PCIe/SATA bus 114, because the differential multiplexer 106 does not process the signals. When a module is connected to the module bay 104, the differential multiplexer 106 can receive a module identification signal identifying the type of the module via the bus select line 126. The module identification signal can be a strobe signal that the differential multiplexer 106 can use to select either the PCIe bus 120 or the SATA bus 122 for communication between the module bay 104 and the south bridge 102. Thus, the differential multiplexer 106 can connect the PCIe/SATA bus 114 with the PCIe bus 120 or with the SATA bus 122 based on the module identification signal received via the bus select line 126. Thus, a signal can be transmitted from the module bay 104 over the PCIe/SATA bus 114, in the differential multiplexer 106, and then to the south bridge 102 over the bus that corresponds with the module located within the module bay.

Upon detecting the presence of a module, via the input/output module type bus 130, the embedded controller 108 can determine whether the module was previously connected to the module bay 104. If so, the embedded controller 108 can obtain the information previously determined about the module, such as the type of module. In one embodiment, the previously determined information can be stored in a local memory within the embedded controller 108 and/or within an external memory in communication with the embedded controller. However, if the module has not been previously connected to the module bay 104, the embedded controller 108 can determine information about the module via a module information signal from the module bay 104 via the I/O module type bus 130. The information about the module can include the type of the module, a class of the module, or the like.

When the embedded controller 108 has determined the type of module, the embedded controller may determine whether to override a ZPODD power control of the module bay 104 from the south bridge 102 to the voltage control switch 110 based on the type of module connected to the module bay 104. If the embedded controller detects that the type of the module is a ZPODD enabled module, the embedded controller can determine not to disable the ZPODD power control from the south bridge 102 of the module bay 104. For example, if the module connected to the module bay 104 is the ODD 140, the embedded controller 108 can determine not to override the south bridge 102 power control of the module bay. The south bridge 102 preferably controls the power to the module bay 104 via the voltage control switch 110, the ZPODD input bus 116, and the ZPODD output bus 118. Thus, when the south bridge 102 detects that the ODD 140 is not actively performing read/write operations, the south bridge can send a power down signal for the module bay 102 to the voltage control switch 110 via the ZPODD output bus 118. The power down signal can be a strobe signal. The voltage control switch 110 can then power down the module bay 104 and the ODD 140 via the Vcc power line 134 between the voltage control switch and the module bay. In an embodiment, the south bridge 102 can determine that the ODD 140 is inactive based on a signal from the module bay 104 over the ZPODD input bus 116.

When the module bay 104 and the ODD 140 have been powered down, the module bay may receive a power on request signal from the ODD requesting power to perform an operation, such as ejecting a disk within the ODD. For example, a user can press an eject button on the outside of the ODD 140, and in response the ODD can send the power on request signal to the module bay 104, which in turn can send a similar power on request to the south bridge 102 via the voltage control switch 110 and the ZPODD input bus 116. The power on signal can be a strobe signal. The south bridge 102 can then send a power on signal to the voltage control switch 110 via the ZPODD output bus 118. The power on signal can be a strobe signal. The power on signal can cause the voltage control switch 110 to provide the module bay 104 and the ODD 140 with power over the Vcc power line 134.

Alternatively, when the embedded controller 108 has determined that the type of the module is not a ZPODD enabled device, the embedded control may override the ZPODD power control of the module bay 104 from the south bridge 102 to the voltage control switch 110. For example, if the module connected to the module bay 104 is the PCIe module 136 or the SATA module 138, the embedded controller 108 can determine to override the south bridge 102 power control of the module bay. Thus, when the embedded controller 108 determines that the PCIe module 136 or the SATA module 138 is connected to the module bay 104, the embedded controller 108 can send a voltage override signal to the voltage control switch via the voltage control override bus 132. The voltage override signal can be a strobe signal, and can cause the voltage control switch 110 to continually provide the necessary voltage to the module bay 104 whether or not the power down or power up strobes are received on the ZPODD output bus 118.

The PCIe module 136 and the SATA module 138 may not provide information to the south bridge 102 via the ZPODD input bus 116. Thus, if the PCIe module 136 or the SATA module 138 is connected to the module bay 104, the south bridge 102 may determine that no active ODD operation is being performed and can send the power down signal for the module bay 102 to the voltage control switch 110 via the ZPODD output bus 118. However, the voltage override signal from embedded controller 108 can prevent the voltage control switch 110 from powering down the module bay 104. The south bridge 102 may not recognize that the PCIe module 136 or the SATA module 138 is connected to the module bay 104, such that the ZPODD operation of the south bridge can always be to power down the module bay. Therefore, the override signal from the embedded controller 108 is utilized to prevent the module bay 104 from being powered down when the PCIe module 136 or the SATA module 138 is connected to the module bay. Thus, information on the PCIe module 136 or the SATA module 138 can be retained during periods of inactivity for the modules.

In an embodiment, the control system 100 can be set up so that the ODD 140 is the default module for the embedded controller 108. In this situation, when the embedded controller 108 detects either the PCIe module 136 or the SATA module 138, the embedded controller can send the voltage override signal to override the south bridge 102 power control of the module bay 104. In another embodiment, the control system 100 can be set up so that the default module is either the PCIe module 136 or the SATA module 138 for the embedded controller 108. In this situation, when the embedded controller 108 detects the ODD 140, the embedded controller can stop sending the voltage override signal to the south bridge 102, such that the south bridge power control of the module bay 104 can be executed by the voltage control switch 110. In an embodiment, the south bridge 102, the embedded controller 108, and the control switch 110 can be incorporated into a single device, such as a microcontroller, a chipset, a power management integrated circuit, or the like.

Figure 2:
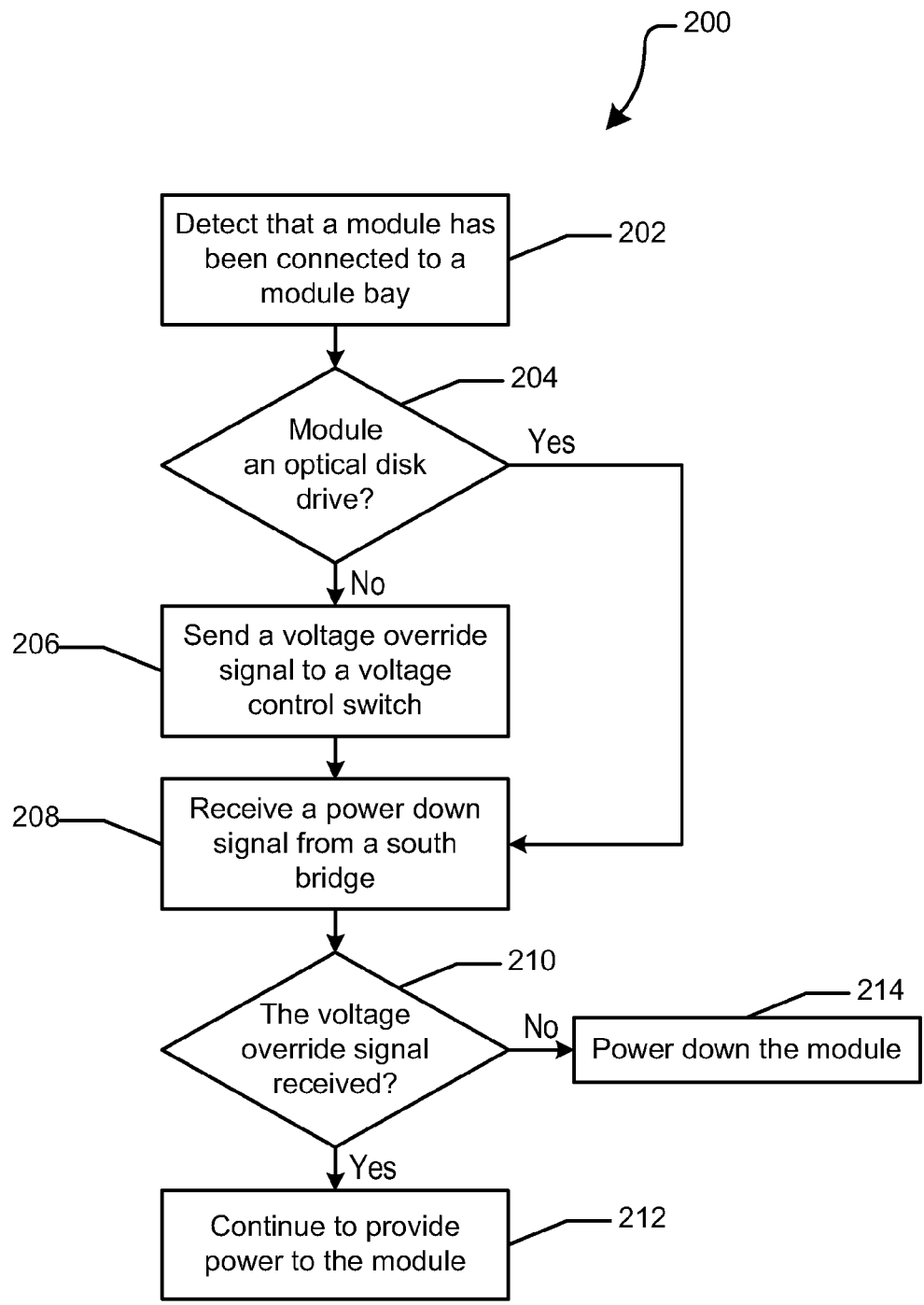
FIG. 2 is a flow diagram of method for overriding power control from a south bridge to a module bay in the information handling system.

FIG. 2 shows a flow diagram of a method 200 for overriding power control from a south bridge to a module bay in an information handling system. At block 202, a module is detected as being connected to the module bay. The module can be a PCIe module, a SATA module, an ODD module, or the like. A determination is made whether the module is the ODD module at block 204. If the module is the ODD module, the method advances to block 208 as described below, otherwise a voltage override signal is sent to a voltage control switch at block 206.

At block 208, a power down signal is received from a south bridge. The power down signal can be in response to a period of inactivity from the module in the module bay. At block 210, a determination is made whether the voltage override signal has been received at the voltage control switch. If the voltage override signal has been received, the voltage control switch continues to provide power to the module bay and the module at block 212. However, if the voltage override signal has not been received, the voltage control switch powers down the module bay and the module at block 214.

Figure 3:
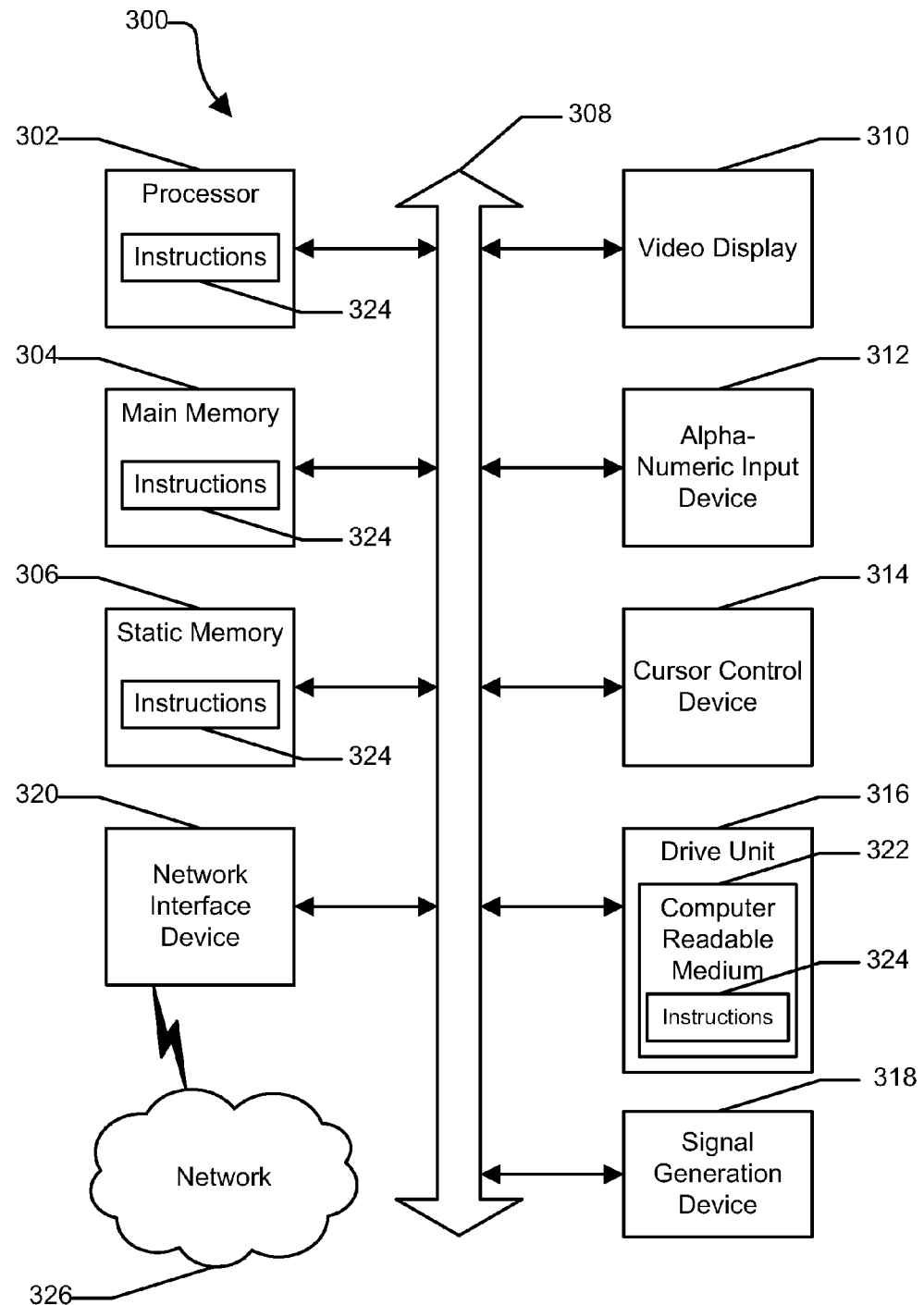
FIG. 3 is a block diagram of a general computer system.

FIG. 3 shows an illustrative embodiment of a general computer system 300 in accordance with at least one embodiment of the present disclosure. The computer system 300 can include a set of instructions that can be executed to cause the computer system to perform any one or more of the methods or computer based functions disclosed herein. The computer system 300 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

The computer system 300 may include a processor 302 such as a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324 such as software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media. The network interface device 320 can provide connectivity to a network 326, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing.

Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a module bay configured to receive a module, and to connect the module to the information handling system;
   a voltage control switch in communication with the module bay, the voltage control switch configured to provide power to the module bay; and
   a controller in communication with the module bay and with the voltage control switch, the controller configured to detect a connection of the module to the module bay, to determine whether the module was previously connected to the module bay, to retrieve information stored about the module in response to the module being previously connected, the information including a type of module for the module, to send a power control override signal to the voltage control switch in response to the type of module being a first type, and to continue to provide power to the module bay and the module after a power down signal for the module bay is received in response to the power override signal being received at the voltage control switch, otherwise to power down the module bay and the module after the power down signal is received in response to the type of module being a second type.

2. The information handling system of claim 1 further comprising:
   a south bridge in communication with the voltage control switch, the south bridge configured to detect a period of inactivity of the module connected to the module bay, and to send the power down signal to the voltage control switch when the period of inactivity is detected.

3. The information handling system of claim 1 further comprising:
   a voltage supply in communication with the voltage control switch, the voltage supply configured to provide a voltage to the voltage control switch.

4. The information handling system of claim 1 wherein the module is selected from a group consisting of a peripheral component interface express module, a serial advanced technology attachment module, and an optical disk drive module.

5. The information handling system of claim 1 wherein the specific type is selected from a group consisting of a peripheral component interface express module and a serial advanced technology attachment module.

6. The information handling system of claim 1 wherein the controller is an embedded controller.

7. An information handling system comprising:
   a module bay;
   a module in communication with the module bay, the module configured to provide storage for the information handling system;
   a voltage control switch in communication with the module bay, the voltage control switch configured to provide power to the module bay; and
   a controller in communication with the module bay and with the voltage control switch, the controller configured to detect a connection of the module to the module bay, to determine whether the module was previously connected to the module bay, to retrieve information stored about the module in response to the module being previously connected, the information including a type of module for the module, to send a power control override signal to the voltage control switch in response to the type of module being a first type, and to continue to provide power to the module bay and the module after a power down signal for the module bay is received in response to the power override signal being received at the voltage control switch, otherwise to power down the module bay and the module after the power down signal is received in response to the type of module being a second type.

8. The information handling system of claim 7 further comprising:
   a south bridge in communication with the voltage control switch, the south bridge configured to detect a period of inactivity of the module connected to the module bay, and to send the power down signal to the voltage control switch when the period of inactivity is detected.

9. The information handling system of claim 7 further comprising:
   a voltage supply in communication with the voltage control switch, the voltage supply configured to provide a voltage to the voltage control switch.

10. The information handling system of claim 7 wherein the module is selected from a group consisting of a peripheral component interface express module, a serial advanced technology attachment module, and an optical disk drive module.

11. The information handling system of claim 7 wherein the specific type is selected from a group consisting of a peripheral component interface express module and a serial advanced technology attachment module.

12. The information handling system of claim 7 wherein the controller is an embedded controller.

13. The information handling system of claim 7 wherein the module connects to the module bay via a slimline connector.

14. A method comprising:
  detecting a connection of a module to a module bay;
  determining whether the module was previously connected to the module bay;
  retrieving information stored about the module in response to the module being previously connected, the information including a type of module for the module;
  sending a power override signal to a voltage control switch in response to the type of module being a first type; and
  continuing to provide power to the module bay and the module after a power down signal for the module bay is received in response to the power override signal being received at the voltage control switch, otherwise powering down the module bay and the module after a power down signal for the module bay is received in response to the type of module being a second type.

15. The method of claim 14 further comprising:
  receiving a power down signal for the module bay; and
  disregarding the power down signal for the module bay when the power override signal has been received at the voltage control switch.

16. The method of claim 14 wherein the module is selected from a group consisting of a peripheral component interface express module, a serial advanced technology attachment module, and an optical disk drive module.

17. The method of claim 14 wherein the specific type is selected from a group consisting of a peripheral component interface express module and a serial advanced technology attachment module.

18. The method of claim 14 wherein the module bay is connected to the module via an interface connector.

19. The method of claim 18 wherein the interface connector is a slimline connector.

* * * * *